United States Patent [19]

Buczek et al.

[11] Patent Number: 4,662,722

[45] Date of Patent: May 5, 1987

[54] POLARIZATION INSENSITIVE MIRROR

[75] Inventors: Carl J. Buczek, Encinitas; James G. Myers, Newport Beach, both of Calif.

[73] Assignee: Ford Aerospace & Communications Corp., Detroit, Mich.

[21] Appl. No.: 737,313

[22] Filed: May 23, 1985

[51] Int. Cl.⁴ .......................... G02F 1/21; G02B 1/10
[52] U.S. Cl. .................................... 350/395; 350/164
[58] Field of Search ......... 350/1.7, 164, 166, 394–395, 350/642

[56] References Cited

U.S. PATENT DOCUMENTS

| | | | |
|---|---|---|---|
| 2,409,407 | 10/1946 | Turner | 350/164 |
| 2,411,955 | 12/1946 | Colbert et al. | 350/166 |
| 2,519,722 | 8/1950 | Turner | 350/164 |
| 3,741,625 | 6/1973 | Saleh | 350/394 |
| 3,765,746 | 10/1973 | Ashley et al. | 350/394 |
| 3,851,973 | 12/1974 | Macek | 350/377 |
| 4,009,933 | 3/1977 | Firester | 350/394 |
| 4,147,409 | 4/1979 | Apfel | 350/164 |
| 4,189,205 | 2/1980 | Vandehei | 350/1.7 |
| 4,312,570 | 1/1982 | Southwell | 350/394 |
| 4,379,622 | 4/1983 | Fischer et al. | 350/394 |

OTHER PUBLICATIONS

Hass, G., "Reflectance & Preparation of Front-Surface Mirrors for Use at Various Angles of Incidence from Ultraviolet to the Far Infrared" Jr. Optical Soc. America, vol. 72, 1-1982, pp. 27-39.

Costich, V. R., "Reduction of Polarization Effects in Interference Coatings", App. Optics, vol. 9, 4-1970, pp. 866-870.

Winterbottom, A. B., "Optical Determination of Thin Films on Reflecting Bases in Transparent Environments", Jr. Opt. Soc. Am., vol. 38, 12-1948, pp. 1074-1082.

J. A. Stratton, Electromagnetic Theory, McGraw-Hill Book Company, Inc., New York and London (1941), sec. 9-4 through 9-14, pp. 490-524.

M. A. Ordal et al., "Optical Properties of the Metals Al, Co, Cu, Au, Fe, Pb, Ni, Pd, Pt, Ag, Ti and W in the Infrared and Far Infrared", Applied Optics, vol. 22, No. 7, pp. 1099-1119, 1 Apr. 1983.

Primary Examiner—William H. Punter
Attorney, Agent, or Firm—Edward J. Radlo; Keith L. Zerschling

[57] ABSTRACT

A polarization insensitive mirror (3) comprises a single homogeneous coating (1) coated onto a typically metallic reflective surface (2). The mirror (3) is substantially insensitive to polarization of incident radiation (4) over a wide range of angles of incidence (A). The coating (1) has an index of refraction (n) greater than 2.4, is substantially transmissive to the incident radiation (4), and has a thickness (t) substantially equal to $L_0/2n$, where $L_0$ is the wavelength of the incident radiation (4) in freespace. Germanium makes a good coating (1). The reflective surface (2) is typically gold or silver. Increasing slightly the thickness (t) of the coating (1) increases the range of incident angles (A) over which the mirror (3) exhibits minimized phase differentials (B). Graphs (FIGS. 3-8) are presented comparing the reflectivity, phase differential (B), and average reflectivity of mirrors (3) fabricated according to the teachings of the present invention with those of the prior art.

5 Claims, 20 Drawing Figures

LASER RADAR TRANSCEIVER APPLICATION

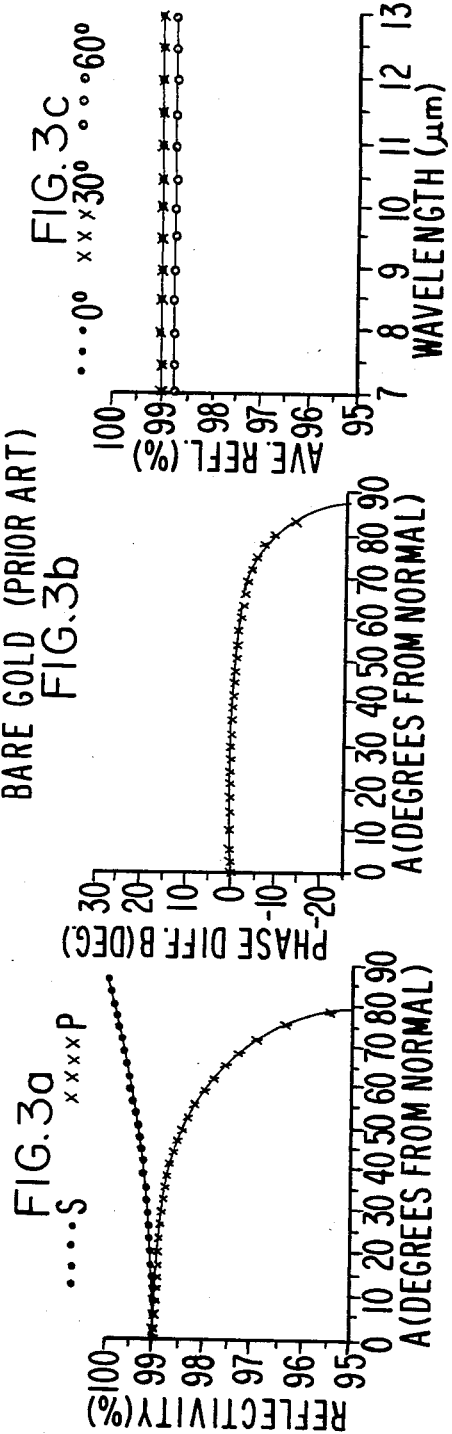
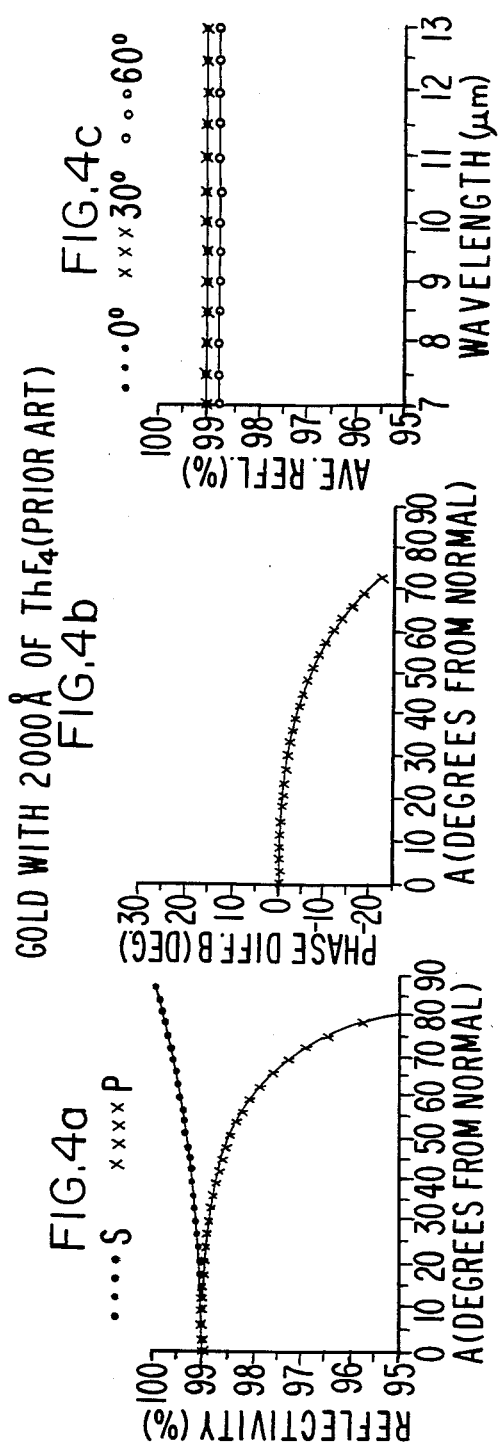

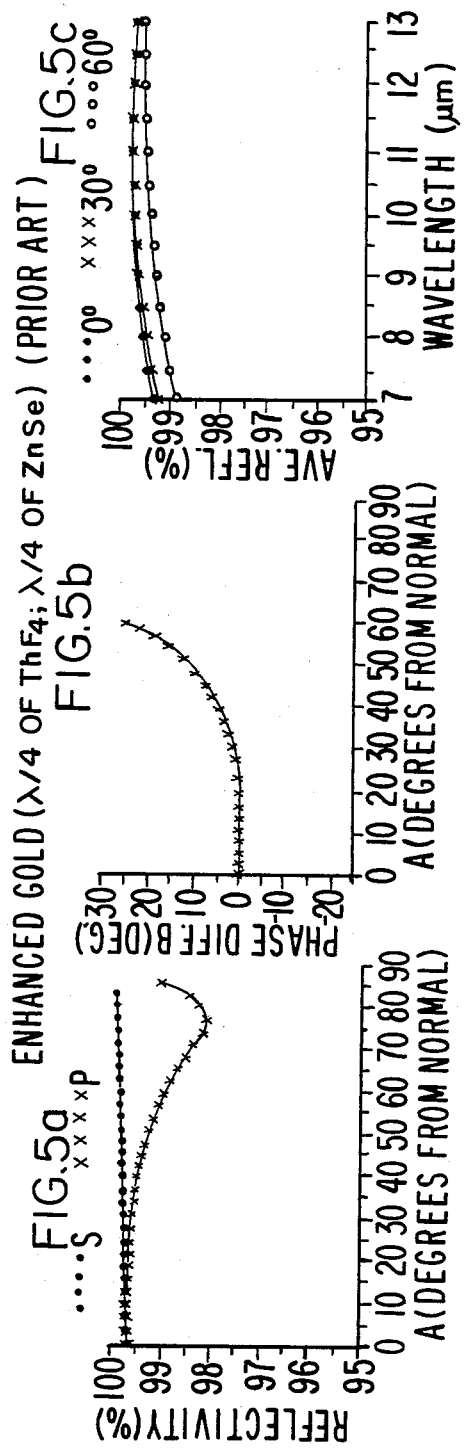
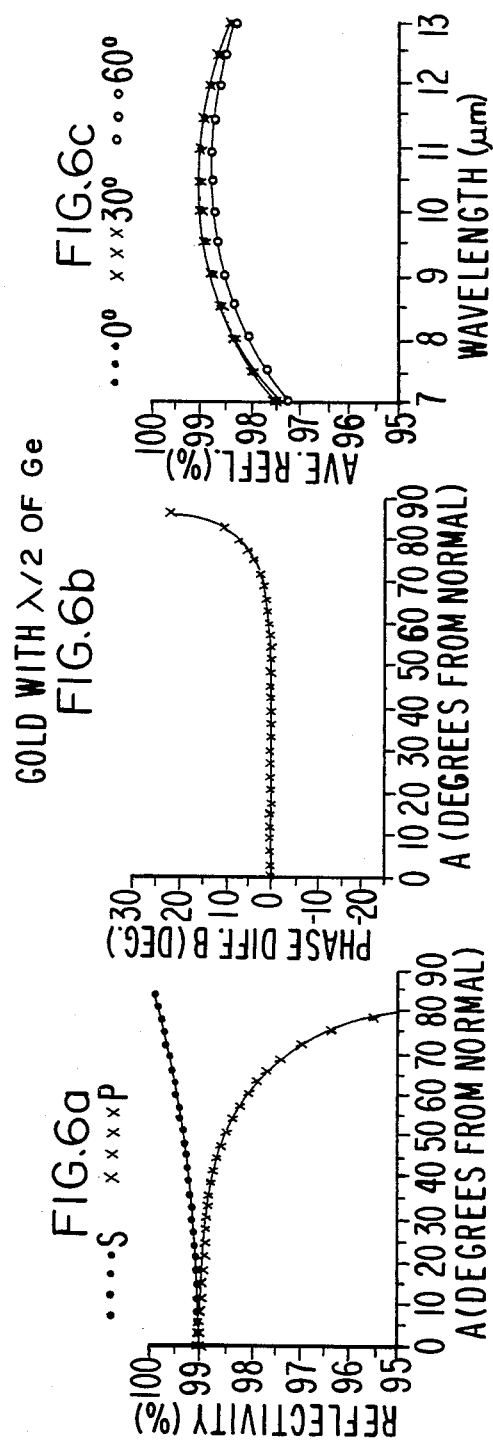

GOLD WITH λ/2 ZnSe

POLARIZATION INSENSITIVE MIRROR

DESCRIPTION

1. Technical Field

This invention pertains to the field of mirrors in which the incident radiation reflects off the mirror with substantially the same phase shift regardless of the polarization of the incident radiation.

2. Background Art

U.S. Pat. No. 4,312,570 discloses a high reflectivity mirror causing a 90° phase shift between s and p incident polarizations. The reflective surface is coated with many quarter wavelength layers. The device is useful only for fixed angles of incident radiation. On the other hand, the present invention coats a reflective surface 2 with a single homogeneous coating 1 having a thickness t substantially equal to half the freespace wavelength divided by the index of refraction n of the coating 1. Furthermore, and very significantly, the instant mirror 3 is useful over a wide range of incident angles A.

U.S. Pat. No. 4,189,205 teaches the use of multiple quarter wavelength layers (and one fifth-of-a-wavelength layer) to achieve better reflectivity in the visible range. The technique described in this reference is useful only for fixed, near-zero angles of incidence. The reference does not suggest how to obtain a wide angle of incidence, low phase differential, high reflectivity coating as in the present invention.

U.S. Pat. No. 4,147,409 discloses the use of multiple quarter-wavelength layers for a high energy, high reflectivity application, such as confinement for fusion energy. This system does not control the phase, and works only for a fixed angle of incidence normal to the plane of the reflector.

U.S. Pat. No. 3,741,625 discloses a polarization insensitive directional coupler using arbitrarily thick layers. The coupler is useful only for fixed angles (not for a wide range of angles as in the present invention), and does not control the phase. In the present invention, on the other hand, the phase differential is kept very small over a wide range of angles of incidence A.

Secondary references are: U.S. Pats. Nos. 2,519,722; 3,765,746; 3,851,973; 4,009,933; and 4,379,622.

DISCLOSURE OF INVENTION

A single homogeneous coating (1) is coated onto a typically metallic reflective surface (2) to form a mirror (3) that is highly reflective and yet is substantially insensitive to the polarization of the incident radiation (4) over a wide range of angles of incidence (A). The coating (1) has an index of refraction (n) greater than 2.4, is substantially transmissive with respect to the incident radiation (4), and has a thickness (t) substantially equal to $L_O/2n$, where $L_O$ is the wavelength of the incident radiation (4) in freespace. As used herein, "freespace" is the medium through which travels the incident radiation (4) before striking the mirror (3). Freespace can be, e.g., air, another gas, or a liquid.

The range of incident angles (A) over which this invention may be used can be extended, e.g., to 80° from normal, by means of slightly increasing the thickness (t) of the coating (1) to be greater than $L_O/2n$ but less than $1.05(L_O)/2n$.

Germanium (n=4) is an excellent choice for coating (1), for use over a range of wavelengths in the near and medium infrared since it it transmissive and its index is nearly constant independent of wavelength in this spectral region. Silicon (n=3.4) has similar properties and would also be suitable for this wavelength region. Other materials such as gallium arsenide (n=3near a wavelength of 11 micrometers) are suitable as well but may be limited to a narrower wavelength range because of their significant dispersion or index variation with wavelength.

The reflective surface (2) is typically fabricated of gold, silver, or copper.

BRIEF DESCRIPTION OF THE DRAWINGS

These and other more detailed and specific objects and features of the present invention are more fully disclosed in the following specification, reference being had to the accompanying drawings, in which:

FIGS. 3a, 3b, and 3c are a related set of graphs illustrating reflectivity, phase differential (B), and average reflectivity, respectively, for a prior art mirror comprising bare gold;

FIGS. 4a, 4b, and 4c are a related set of graphs illustrating reflectivity, phase differential (B), and average reflectivity, respectively, for a prior art mirror comprising gold coated with 2000 angstroms of thorium fluoride;

FIGS. 5a, 5b, and 5c are a related set of graphs illustrating reflectivity, phase differential (B), and average reflectivity, respectively, of a prior art mirror comprising gold coated with a quarter wavelength of thorium fluoride, which in turn is coated with a quarter wavelength of zinc selenide;

FIGS. 6a, 6b, and 6c are a related set of graphs illustrating reflectivity, phase differential (B), and average reflectivity, respectively, of a miror (3) of the instant invention comprising a gold surface (2) coated with a half wavelength optical thickness germanium coating (1);

BEST MODE FOR CARRYING OUT THE INVENTION

Figure 1:
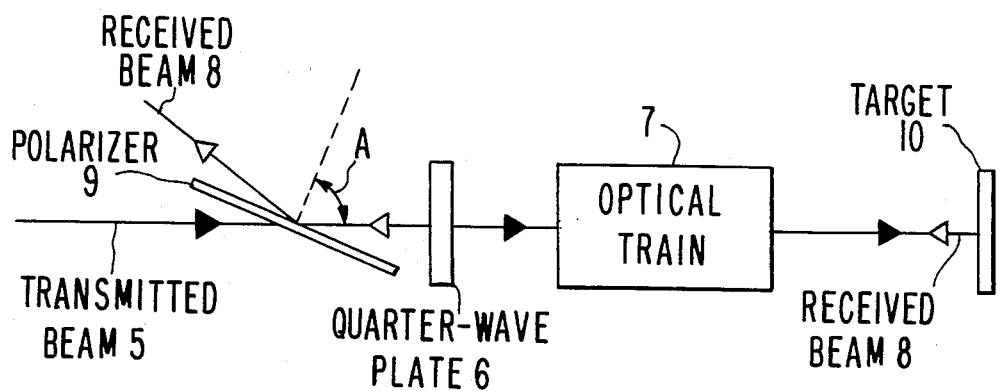
FIG. 1 is a schematic diagram of a typical application for the present invention, i.e., a laser radar transceiver.

FIG. 1 illustrates the need for this invention in a typical application: that of carbon dioxide laser radars.

In most carbon dioxide laser radars, the transmitted and received beams 5, 8 are separated at a polarizer 9. The transmitted beam 5, initially linearly polarized, is made circularly polarized by a quarter-wave plate 6 or equivalent means, after the beam 5 passes through polarizer 9. Beam 5 is scattered by target 10, but the polarization in this spectral region is substantially preserved in received beam 8, which becomes orthogonally polarized to the initial transmitted beam 5 after traveling through quarter-wave plate 6. This return beam 8 then is separated at polarizer 9.

For many laser radars, there are a large number of optical elements in an optical train 7 interposed between the quarter-wave plate 6 and the target 10. Thus, there are a large number of refractive and reflective surfaces within optical train 7. These surfaces, in the usual scanned geometry, can present angles of incidence A to the incident radiation 5, 8 that vary from 0° to as much as 60° (measured with respect to normal; see FIG. 2). These surfaces can have different reflection and phase characteristics for polarization in which the E-vector is in the plane of incident (the p wave) and polarization in which the E-vector is orthogonal to the plane of incidence (the s wave). These differences change the polarization state from the preferred circular polarization to elliptical, resulting in a decrease in received energy separated by polarization duplexer 9.

The net two-way optical transmission T, taking into account transmission losses and phase difference losses, is given by:

$$T = [T_s + T_p + 2(T_s T_p)^{\frac{1}{2}} \cos B]/4$$

where $T_s$ and $T_p$ are the two-way transmissions of the optical elements 7 for the s and p waves, respectively, and the phase differential B is the phase of the s wave minus the phase of the p wave. In order to determine the sensitivity of this expression to B, we can consider the case where $T_s = T_p$. For this example, a B equal to 90° would, for the geometry in FIG. 1, result in an additional 50% net transmission loss; larger B's result in much greater losses. Since a two-way transmission through the optics 7 can involve as many as 100 surfaces, it is important to keep to a minimum the phase difference B per surface. It would be desirable to keep this phase difference B per surface less than 1° or 2° if at all possible, to allow for geometric flexibility in design.

Figure 2:
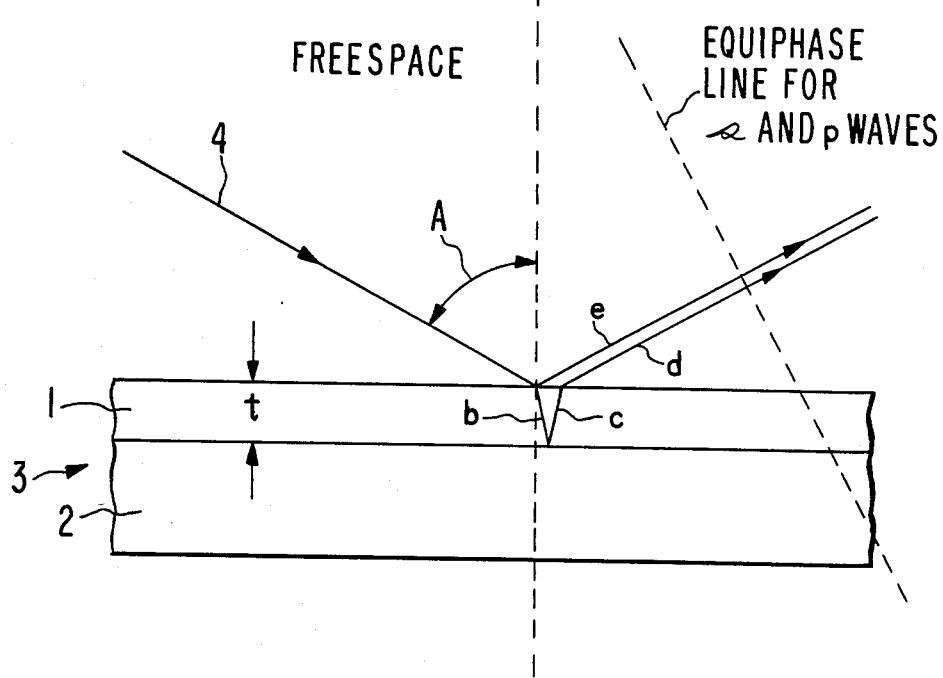
FIG. 2 is a sketch showing the incident radiation (4) reflecting off the mirror (3) of the present invention.
Figures 7A, 7B, 7C:
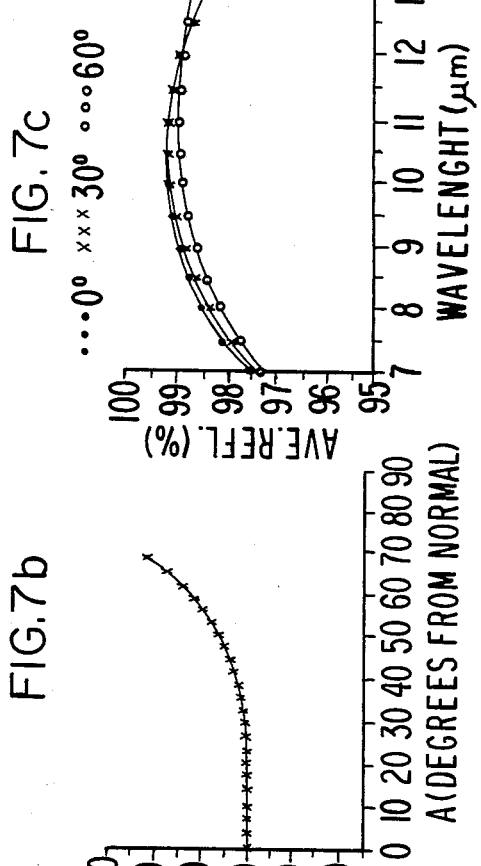
FIGS. 7a, 7b, and 7c are a related set of graphs illustrating reflectivity, phase differential (B), and average reflectivity, respectively, of an alternative embodiment of the mirror (3) of the present invention in which a gold surface (2) is coated with a half wavelength optical thickness zinc selenide coating (1)

FIG. 2 illustrates the geometry involved when incident radiation 4 reflects off mirror 3 of the present invention. Since the coating 1 has a high index of refraction n, a component b of radiation 4 is bent sharply when it reaches the freespace/coating 1 interface. Thus, over a very wide range of angles of incidence A, component b strikes the reflective surface 2 almost orthogonally. For a perfectly normal incident wave, a reflector 2 will reflect the p component and s component equally.

A second component e of incident radiation 4 reflects off the freespace/coating 1 interface. Component b is almost totally reflected off the coating 1/reflector 2 interface, since surface 2 is an excellent reflector. This reflected component c then refracts sharply as it re-emerges through the coating 1/freespace interface, where it becomes component d and is parallel with component e. Components e and d form a pattern of constructive interference due to the thickness t of coating 1 and the geometries involved. Coating 1 has an optical thickness of a half wavelength ($L_O/2$). Since the optical thickness of a medium is defined to be the physical thickness of the medium multiplied by the medium's index of refraction, it follows that the physical thickness t of coating 1 is equal to $L_O/2n$.

In the usual scanning laser radar, many of the reflecting elements, e.g., scan mirrors, beam-bending mirrors, and corner mirrors, are fabricated of metal. In the $CO_2$ infrared region, these surfaces are often gold-coated to enhance their reflectivity. The properties of a prior art bare gold surface are shown in FIGS. 3. For all of FIGS. 3-8, the reflective surface is gold, which has a reflectivity of 99%, a real index of refraction of 11.50, and an imaginary index of refraction of 67.50.

The data points plotted in FIGS. 3-8 were computed using four analytical expressions. The method of solution is outlined in many optics books and follows the classical Fresnel equations. E.g., J. A. Stratton, *Electromagnetic Theory*, McGraw-Hill Book Company, Inc., New York and London (1941), sec. 9-4 through 9-14, pp. 490-524; M. A. Ordal et al., "Optical properties of the metals Al, Co, Cu, Au, Fe, Pb, Ni, Pd, Pt, Ag, Ti, and W in the infrared and far infrared", *Applied Optics*, Vol. 22, No. 7, pp. 1099-1119, Apr. 1, 1983.

FIGS. 3a, 4a, 5a, 6a, 7a, and 8a show the percent reflectivity for the s wave and p wave as a function of angle of incidence A at the center wavelength of the incident radiation 4, which is assumed to be 10.6 microns in freespace. FIGS. 3b, 4b, 5b, 6b, 7b, and 8b are graphs of the phase differential B as a function of angle of incidence A, for the center wavelength of 10.6 microns. FIGS. 3c, 4c, 5c, 6c, 7c, and 8c are the reflectivity averaged over both the s wave and the p wave as a function of wavelength assuming no dispersion, i.e., assuming the index of refraction of gold reflecting surface is not a function of wavelength over this range of wavelengths. This approximation is valid to the first order. All of the wavelengths underlying FIGS. 3-8, i.e., 7 microns to 13 microns, are infrared frequencies important for passive infrared systems.

FIGS. 3 show that bare gold can have a high reflectivity for both polarizations, and a low phase difference B on reflection (B less than 2° for A=0° to A=60°) near $CO_2$ wavelengths.

It is desirable that reflective surfaces comprising gold and similar metals such as silver be protected with a dielectric layer to enable the reflective surfaces to be cleaned and to protect said surfaces from the environment. The caracteristics of a mirror coated with a typical prior art protective coating, 2000 angstroms (0.2 micron) of the low-refractive-index (n=1.350) thorium fluoride, are shown in FIG. 4. This 2000 angstroms is equivalent to a phase shift of 9.2°, where 360° equals one wavelength. This is about the thinnest protective layer than can be applied (by thermal deposition or sputtering). Such a layer is applied for protective purposes only. It is apparent that, although the reflective properties of the surface are preserved by this coating (FIG. 4a), the phase-difference properties (FIG. 4b) are degraded compared with the pure gold reflector depicted in FIG. 3b. The phase difference B is greater than 10° at a 60° angle of incidence A.

A typical prior art commercial reflection-enhancement coating consisting of alternating layers of quarter wavelength layers of high and low index materials is illustrated in FIG. 5. A layer of thorium fluoride having an optical thickness of a quarter-wavelength (and a physical thickness of 1.963 microns) is coated onto the gold. The thorium fluoride layer is in turn coated with a layer of zinc selenide having an optical thickness of a quarter wavelength (a physical thickness of 1.103 microns). Zinc selenide has an index of refraction of 2.403. The reflectivity of this mirror is enhanced because the incident radiation reflects off the gold surface and off the coating as well. The reflectivity is enhanced over all angles of incidence A, and the average reflectivity is high over the 8 micron to 12 micron region of importance to passive infrared systems. However, the phase difference B for this coating reaches 25° at A=60°, making it unsuitable for many laser radar applications.

FIG. 6 show how the present invention solves this problem: a gold reflective surface 2 is coated with a half-wavelength optical thickness (t=1.325 microns) coating 1 of the high-index (n=4.000) germanium. This combination preserves the surface 2 reflectivity at the design wavelength. Very importantly, the phase difference B is negligible over angles of incidence A between 0° and 60°. By comparing FIG. 6b with FIG. 3b, one sees that the (absolute value of the) phase difference B is less with the half-wavelength optical thickness germanium coating 1 than with the bare gold, for all angles of incidence A. In addition, the average reflectivity is high from 8 microns to 12 microns, of importance to systems where an active $CO_2$ laser radar and a passive infrared system share the same optics.

The importance of a high refractive index n for the coating 1 is illustrated in FIG. 7. Here, a half-wavelength optical thickness (t=2.206 microns) zinc selenide coating 1 has been coated onto the gold surface 2. The phase difference B for this coating 1 reaches 11° at A=60°, sufficiently large to be a problem for certain applications, but suitable for other applications. Thus, the ZnSe index of 2.403 is deemed to be just greater than the minimum acceptable for use in this invention.

Figure 8A:
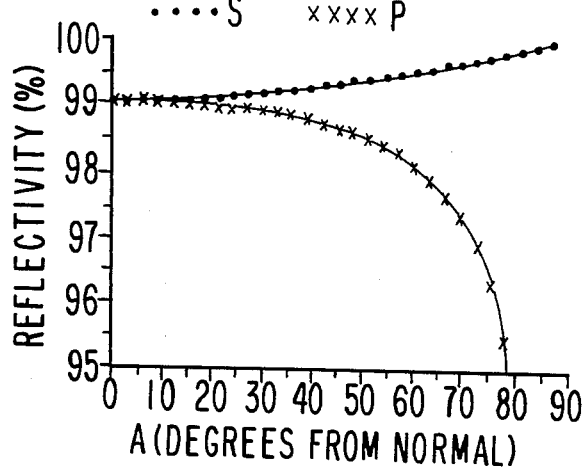
FIGS. 8a, 8b, and 8c are a related set of graphs illustrating reflectivity, phase differential (B), and average reflectivity, respectively, of an alternative embodiment of the present invention in which a gold surface (2) is coated with a coating (1) of germanium that has an optical thickness about 1% greater than half a wavelength.
Figure 8B:
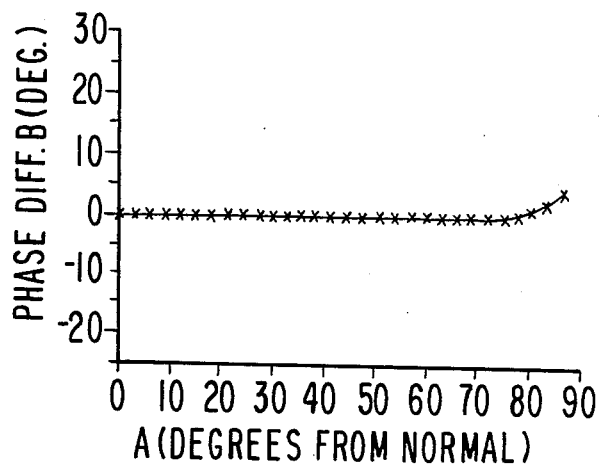
Figure 8C:
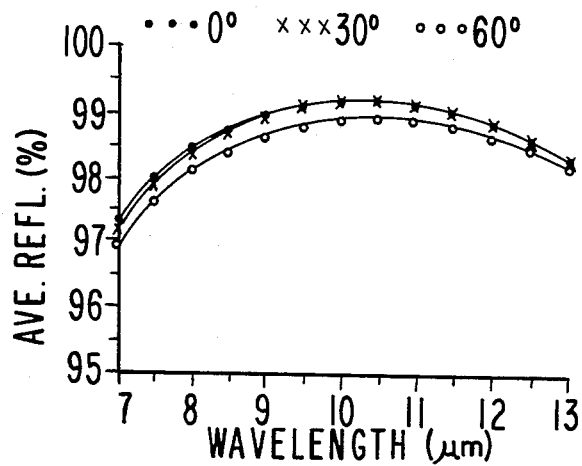

FIG. 8 show how a slight increase (about 1%) in the germanium coating 1 thickness t can extend the minimized phase difference range out to A=80°. In FIG. 8, the germanium coating 1 is 1.340 microns thick (182°). In general, t can be increased by up to about 5% and useful results still be obtained. Compared with FIG. 6b, FIG. 8b shows a very small phase difference for incident angles A of 0° to 70°, but much better phase difference performance for angles A between 70° and 85°; i.e., the shape of the phase curve has been changed in favor of high incident angles A. FIG. 8c shows good reflectivity; it is easier to compensate for discrepancies in reflectivity than for those in phase shift.

There are several methods for obtaining high reflectance surfaces 2, some of which are as follows: (a) using polished layers 2 of gold or copper; (b) vacuum depositing gold, silver or copper coatings 2 onto polished substrates of stable metals, glass, silicon, germanium or the like; (c) electrolytically depositing gold coatings 2 onto certain metal substrates; (d) chemically depositing a silver coating 2 onto a glass. Silver corrodes so readily that it nearly always must have a protective coating layer. Copper also corrodes easily. Gold does not corrode, but is relatively soft and damages easily. A vacuum deposited or sputtered coating 1 of germanium will act as a hard and environmentally protective coating for the metal surfaces 2.

A high index, half-wavelength optical thickness coating 1, fabricated of a meterial such as germanium, on a reflective surface 2 comprising gold or a similar metal such as silver provides a durable coating layer 1 that maintains the metal surface 2 reflectivity and yields a very low phase difference B over wide angles of incidence A. Germanium adheres well to gold and offers good protection. It is also substantially transmissive; the optical absorptivity of Ge is 2%/cm for crystalline Ge and 3.5%/cm for polycrystalline Ge. Gallium arsenide and silicon are also suitable materials for coating 1, because they are also highly transmissive and have high indices (n about equal to 3 for each of GaAs and Si).

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A polarization insensitive mirror for reflecting incident radiation with substantially the same phase shift regardless of the polarization of the incident radiation, said mirror comprising:

a reflective surface disposed to face the incident radiation;

a single homogeneous coating in intimate contact with the reflective surface, wherein said homogeneous coating:

is substantially transmissive to the incident radiation;

has a thickness substantially equal to $L_O/2n$, where $L_O$ is the wavelength of the incident radiation in freespace and n is the index of refraction of the homogeneous coating; and has an index of refraction greater than 3.

2. The mirror of claim 1 wherein the homogeneous coating has a thickness of between $L_O/2n$ and $1.05(L_O)/2n$.

3. The mirror of claim 1 wherein the homogeneous coating is fabricated of germanium.

4. The mirror of claim 1 wherein the reflective surface is fabricated of a metal from the group of metals comprising gold and silver.

5. The mirror of claim 1 wherein $L_O$ is between 7 microns and 13 microns.

* * * * *